(12) United States Patent  
Pala (10) Patent No.: US 12,200,145 B2
(45) Date of Patent: *Jan. 14, 2025

(54) SYSTEMS AND METHODS FOR ENHANCED ONLINE CERTIFICATE STATUS PROTOCOL

(71) Applicant: CABLE TELEVISION LABORATORIES, INC, Louisville, CO (US)

(72) Inventor: Massimiliano Pala, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,748

(22) Filed: May 31, 2022

(65) Prior Publication Data

US 2022/0294648 A1    Sep. 15, 2022

Related U.S. Application Data

(63) Continuation of application No. 16/254,259, filed on Jan. 22, 2019, now Pat. No. 11,349,673.

(60) Provisional application No. 62/619,547, filed on Jan. 19, 2018.

(51) Int. Cl.
*H04L 9/32* (2006.01)
*G06F 16/22* (2019.01)
*G06F 16/245* (2019.01)

(52) U.S. Cl.
CPC ............ *H04L 9/3268* (2013.01); *G06F 16/22* (2019.01); *G06F 16/245* (2019.01)

(58) Field of Classification Search
None
See application file for complete search history.

(56) References Cited

U.S. PATENT DOCUMENTS

| | | | |
|---|---|---|---|
| 5,903,651 A | 5/1999 | Kocher | |
| 5,903,882 A | 5/1999 | Asay et al. | |
| 6,044,462 A | 3/2000 | Zubeldia et al. | |
| 6,230,266 B1 | 5/2001 | Perlman et al. | |
| 10,135,623 B2 * | 11/2018 | Lin | H04L 9/006 |
| 2002/0099822 A1 * | 7/2002 | Rubin | H04L 9/3268 |
| | | | 709/225 |
| 2008/0244263 A1 | 10/2008 | Lindemann | |
| 2012/0124382 A1 | 5/2012 | Little et al. | |
| 2013/0117558 A1 * | 5/2013 | Metke | H04L 9/3268 |
| | | | 713/156 |

(Continued)

*Primary Examiner* — Esther B. Henderson
(74) *Attorney, Agent, or Firm* — Josh C. Snider; Snider IP (57) ABSTRACT

A system for monitoring the status of digital certificates is provided. The system includes a responder computer device. The responder computer device is programmed to store, in a database, a plurality of statuses associated with a plurality of digital certificates. The responder computer device is also programmed to receive, from a first computer device, a request message including an identifier of a target certificate. The responder computer device is further programmed to query the database to retrieve status information about the target certificate. In addition, the responder computer device is programmed to generate a response message based on the retrieved status information. Moreover, the responder computer device is programmed to transmit the response message to the first computer device.

19 Claims, 3 Drawing Sheets

(56) References Cited

U.S. PATENT DOCUMENTS

2013/0346746 A1 12/2013 Ghosh
2018/0262346 A1* 9/2018 Levy .................... H04L 9/3268

* cited by examiner

SYSTEMS AND METHODS FOR ENHANCED ONLINE CERTIFICATE STATUS PROTOCOL

CROSS REFERENCE TO RELATED APPLICATIONS

This application is a continuation of U.S. patent application Ser. No. 16/254,259, filed Jan. 22, 2019, which application claims the benefit of and priority to U.S. Provisional Patent Application No. 62/619,547, filed Jan. 19, 2018, entitled "ONLINE CERTIFICATE STATUS PROTOCOL," the entire contents and disclosures of which are incorporated by reference in its entireties.

BACKGROUND

The field of the disclosure relates generally to an enhanced online certificate status protocol, and more particularly, to systems and methods for streamlining requests for the revocation status of digital certificates.

Many conventional electronic devices utilize digital certificates, such as X.509 certificates to establish trust between devices. The digital certificates are tied to the identity of a person or legal entity, typically through a trusted Certificate Authority (CA). Overtime the digital certificates may need to be revoked for a variety of reasons, such as, the encryption keys associated with the certificate have been compromised, there are errors within an issued certificate, there is a change in usage of the certificate, or the certificate owner is no longer deemed to be trusted. There are two methods of revocation a Certificate Revocation List (CRL) and the Online Certificate Status Protocol (OCSP). The CRL is a list of revoked certificates (by serial number) that have been issued and then subsequently revoked by a given CA. CRLs are generally published on a periodic interval or can be published only when a certificate is revoked by the CA.

The Online Certificate Status Protocol (OCSP) was originally introduced to overcome the limitations of certificates revocation checking related to the use of CRLs. With the deployment of high-frequency and high-volume infrastructures for authentication and authorization, today the OCSP protocol's deployment best practices include the use of large deployment infrastructures and the periodic pregeneration of large quantities of responses to address the ever increasing number of requests. The trend is expected to grow with the deployment of device PKIs. This pregeneration of responses may lead to increased vulnerability to replay attacks where a signed, 'good' response is captured by a malicious intermediary and replayed to the client at a later date after the subject certificate may have been revoked.

In some situations, a user computer device receives a certificate, such as an X.509 certificate, through a web browser and needs to verify the information related to the revocation status of the certificate. To proceed, the user computer device looks up the server where the information relating to the revocation status may be found. In some embodiments, this is done by using one or more URLs embedded in the certificate or by using locally configured options. In some cases, the transport protocol, such as raw TCP, requires the submission of an OCSP request to determine the status of the certificate. In these situations, the user computer device generates the OCSP request and transmits the query to an OCSP responder. The OCSP responder responds with an OCSP response that includes information about the revocation status of the certificate.

SUMMARY

In an embodiment, a system for monitoring the status of digital certificates is provided. The system includes a responder computer device including at least one processor in communication with at least one memory device. The at least one memory device stores a plurality of instructions. When executed by the at least one processor, the plurality of instructions cause the at least one processor to store, in a database, a plurality of statuses associated with a plurality of digital certificates. The plurality of instructions also cause the at least one processor to receive, from a first computer device, a request message including an identifier of a target certificate. The plurality of instructions further cause the at least one processor to query the database to retrieve status information about the target certificate. In addition, plurality of instructions cause the at least one processor to generate a response message based on the retrieved status information. Moreover, plurality of instructions cause the at least one processor to transmit the response message to the first computer device.

In another aspect, a method for monitoring the status of digital certificates is provided. The method is implemented by a responder computer device including at least one processor in communication with at least one memory device. The at least one memory device stores a plurality of instructions. The method includes storing, in a database, a plurality of statuses associated with a plurality of digital certificates. The method also includes receiving, from a first computer device, a request message including an identifier of a target certificate. The method further includes querying the database to retrieve status information about the target certificate. In addition, the method includes generating a response message based on the retrieved status information. Moreover, the method includes transmitting the response message to the first computer device.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The embodiments described herein provide systems and methods for expanding the ranges of certificates that OCSP responses are able to be provided for as well as expanding the information provided about a certificate in the OCSP response. More specifically, the systems and methods described herein provide enhanced OCSP request and response messages.

In an exemplary embodiment, the present systems and methods utilize an X.509 trust model, in which a trusted third party CA is responsible for signing digital certificates. Accordingly, as described herein, the CA is presumed to have capability to store one or more trusted root certificates (or intermediate certificates) as well as the corresponding private keys. The CA is further responsible for maintaining up-to-date revocation information regarding the validity of issued certificates, and will provide information to the other parties, for example, through an Online Certificate Status Protocol (OCSP). In some embodiments, the CA may provide information according to a Certificate Revocation List (CRL). The OCSP is an Internet protocol for obtaining a revocation status of an X.509 digital certificate, and is generally considered an alternative to the CRL. OCSP messages may be communicated, for example, by Abstract Syntax Notation One (ASN.1) encoding over the Hypertext Transfer Protocol (HTTP), from and to OCSP responders of the CA server (or OCSP server).

In exemplary operation, the CA receives OCSP request messages from the ecosystem members and confirms the revocation status of a corresponding certificate (e.g., stored in the trusted database of the CA), and the OCSP responder of the CA transmits an OCSP response message indicating the revocation status (e.g., "valid," "revoked," "unknown," etc., or an error message if the request message may not be processed). The present systems and methods improve upon conventional CA operation by providing additional information about the revocation status of the certificate. This enhanced protocol includes an enhanced OCSP request message and an enhanced OCSP response message In the exemplary embodiment, the enhanced OCSP request message includes the following information: a protocol version, the serial number of the target certificate, a hash of the issuing certificate authority, and a signature. In some embodiments, the protocol version and the signature are optional.

The protocol version indicates the version of the OCSP request being transmitted. This allows the enhanced OCSP system to support enhanced and unenhanced revocation requests to allow for backward compatibility. In some embodiments, different OCSP responders may be configured to handle different versions of revocation requests where the certificate may include the information about which server to transmit the request to based on the version of request. In other embodiments, a single OCSP responder may respond to multiple different versions of requests.

The target certificate's serial number is used to uniquely identify the certificate among the ones issued under the issuing certifying authority (CA). The hash of the issuing certificate authority is used to uniquely identify the certificate authority that issued the certificate whose revocation status is being requested. In addition, the requestor can sign the request and add the signature to the request.

In the exemplary embodiment, the enhanced OCSP response message includes the following information: a protocol version, the certificate revocation status, the response validity period, the revocation information (for revoked certificates), the range of certificates that the response is valid for, and a signature. In some embodiments, the protocol version and the revocation information are optional.

The protocol version indicates the version of the OCSP response. The certificate revocation status provides the revocation status information for the certificates in the range specified in the response. The response validity period indicates the response freshness and the amount of time (optional) that the response can be cached for. The revocation information provides additional details about the revocation time and optionally about the certification revocation list (CRL) where the revocation information is asserted and the revocation reason (if available). The range of certificates specifies the beginning and the ending of the range of serial numbers for which the response is authoritative for. The signature carries the authentication information required to validate the response's data.

Figure 1:
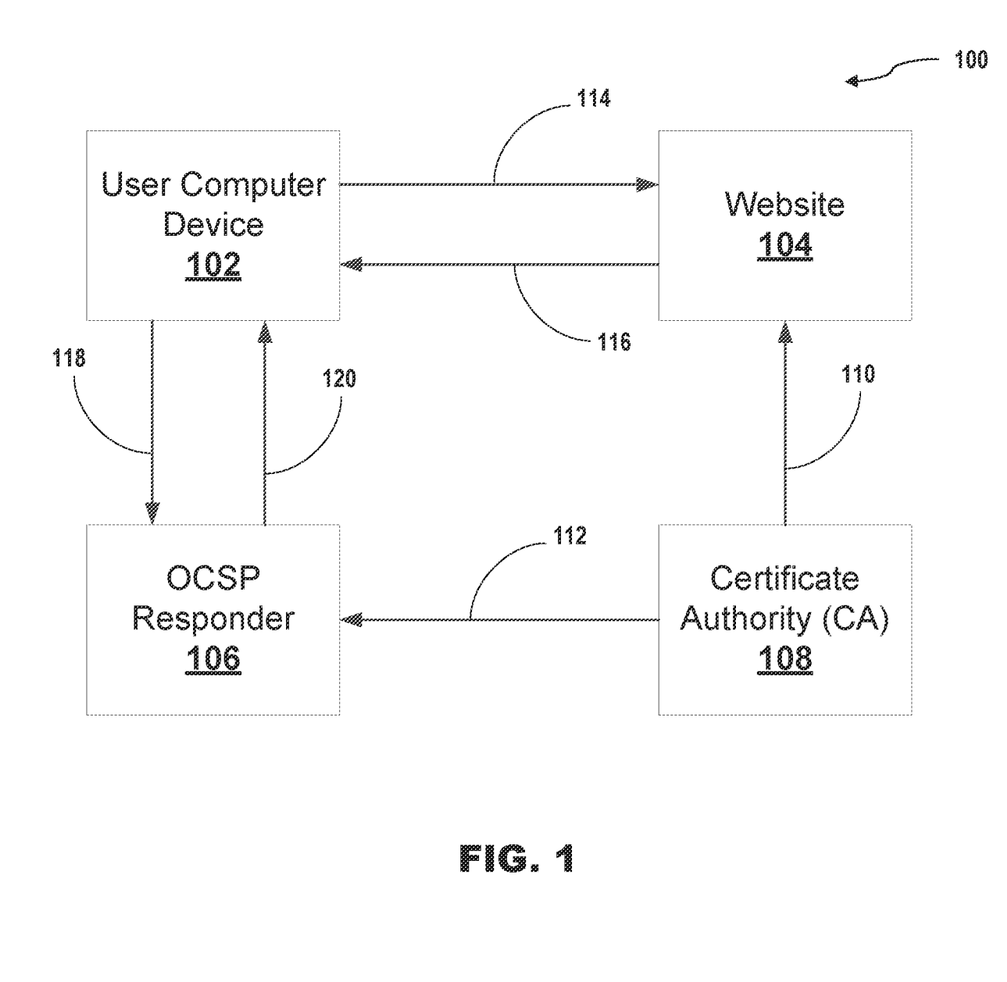
FIG. 1 is a schematic illustration of an enhanced OCSP request and response process, according to an embodiment.

FIG. 1 is a schematic illustration of an enhanced OCSP request and response process 100.

In at least one embodiment, initially a Certificate Authority (CA) 102 provides 110 a digital certificate to a website 104 to generate a trust level for the website 104. The CA 108 also provides 112 the status of the digital certificate to an Online Certificate Status Protocol (OCSP) server 106, also known as an OCSP responder 106. In some embodiments, the CA 108 provides 112 another update to the status of the digital certificate to the OCSP responder 106 whenever that status changes.

In the exemplary embodiment, a user computer device 102 attempts to access 114 the website 104. The website 104 provides 116 the digital certificate to the user computer device 102. The user computer device 102 then needs to verify the information related to the revocation status of the provided digital certificate. The user computer device 102 determines which server this information may be retrieved from. In some embodiments, the address of the OCSP responder 106 is located in the digital certificate. In other embodiments, the user computer device 102 includes one or more locally configured options that allow it to request the revocation status of the digital certificate. The website 104 then transmits a query (a OCSP request 118) to the OCSP responder 106 to determine the status of the digital certificate. The OCSP responder 106 responds with an OCSP response 120 including the revocation status of the digital certificate. If the certificate has not associated revocation information, the OCSP response 120 will include a non-revoked status. In some embodiments, such as in situations validating not only the revocation information, but also the existence of the digital certificate, the OCSP response 120 may include an extension that provides the requesting party with the hash of the certificate requested.

In the exemplary embodiment, the user computer device 102 may transmit an enhanced OCSP request 118 to the OCSP responder 106. The OCSP responder 106 then responds with an enhanced OCSP response 120. OCSP messages 118 and 120 may be communicated, for example, by Abstract Syntax Notation One (ASN.1) encoding over the Hypertext Transfer Protocol (HTTP), from and to OCSP responders 106. While the systems described herein include options for HTTP and DNS transport protocols, ones having skill in the art will realize that other protocols may be used to provide ad-hoc implementations to support specific ecosystems.

The user computer device 102, may include, but is not limited to an IoT device, a client computing device (e.g., a smartphone, tablet, laptop, desktop computing device, wearable, or other computing device), or another type of device that allows the system to work as described herein.

In some embodiments, the digital certificate includes the address of the OCSP responder 106. In some further embodiments, the digital certificate includes an address for a first OCSP responder 106 that supports basic OCSP requests and a second OCSP responder 106 that supports enhanced OCSP requests. In other embodiments, the OCSP responder 106 supports both basic and advanced OCSP requests. In further embodiments, the OCSP responder 106 may forward the OCSP request to an OCSP responder 106 that supports the version of the request.

In the exemplary embodiment, the enhanced OCSP request message 118 includes the following information: a protocol version, the serial number of the target certificate, a hash of the issuing CA 108, and a signature. In some embodiments, the protocol version and the signature are optional.

The protocol version indicates the version of the OCSP request 118 being transmitted. This allows the enhanced OCSP system to support enhanced and unenhanced revocation requests to allow for backward compatibility. The target certificate's serial number is used to uniquely identify the certificate among the ones issued under the issuing CA 108. The hash of the issuing CA 108 is used to uniquely identify the CA 108 that issued the certificate whose revocation status is being requested. In addition, the requestor can sign the request and add the signature to the request.

In the exemplary embodiment, the enhanced OCSP response message 120 includes the following information: a protocol version, the certificate revocation status, the response validity period, the revocation information (for revoked certificates), the range of certificates that the response is valid for, and a signature. In some embodiments, the protocol version and the revocation information are optional.

The protocol version indicates the version of the OCSP response 120. The certificate revocation status provides the revocation status information for the certificates in the range specified in the response. The response validity period indicates the response freshness and the amount of time (optional) that the response can be cached for. The revocation information provides additional details about the revocation time and optionally about the certification revocation list (CRL) where the revocation information is asserted and the revocation reason (if available). The range of certificates specifies the beginning and the ending of the range of serial numbers for which the response is authoritative for. The signature carries the authentication information required to validate the response's data.

Figure 2:
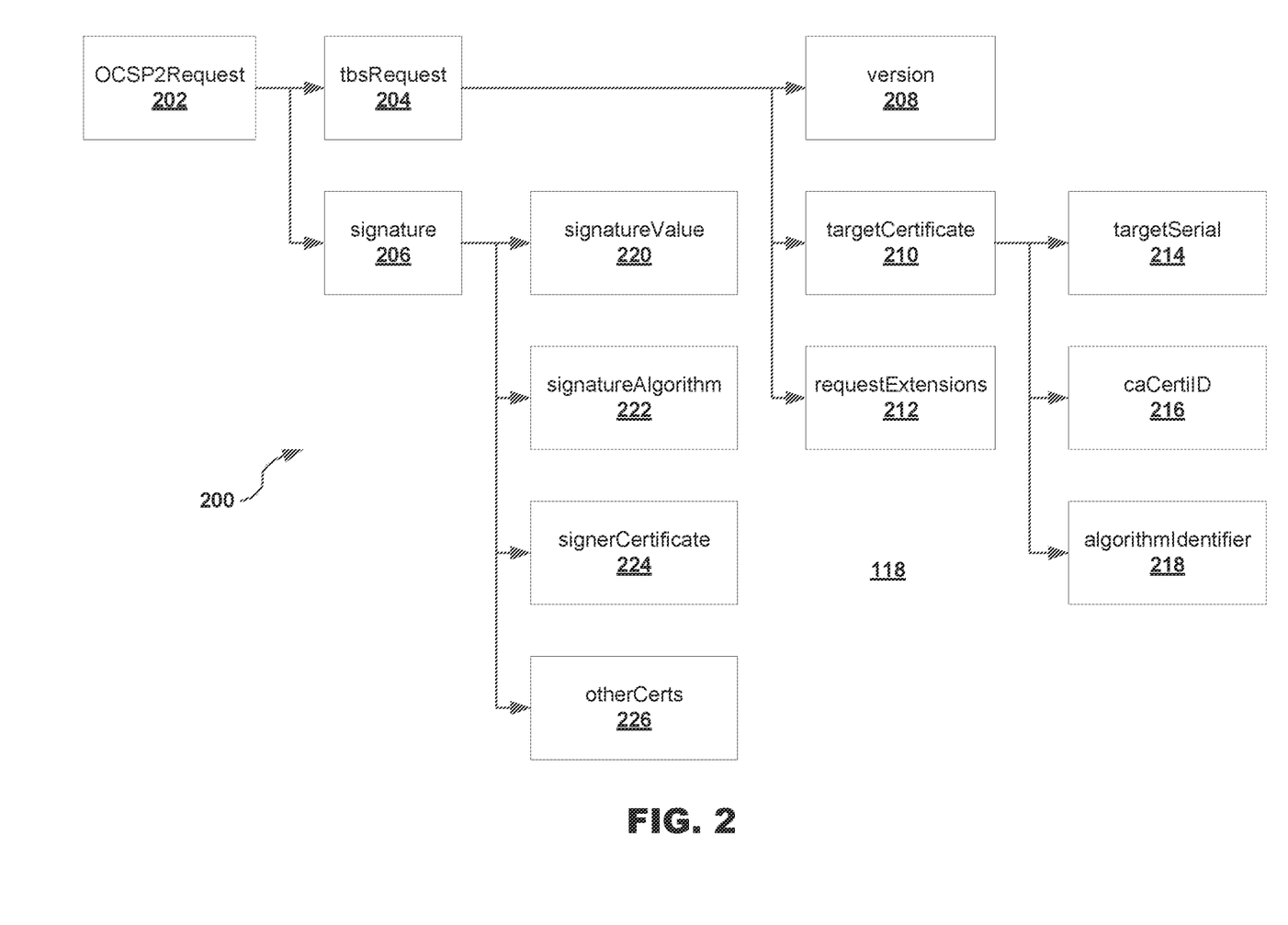
FIG. 2 is a schematic illustration of the data structure of the enhanced OCSP request shown in FIG. 1.

FIG. 2 is a schematic illustration of the data structure of the enhanced OCSP request 118 shown in FIG. 1. For the purposes of this explanation, the enhanced OCSP will notated as OCSP2 to distinguish it from basic OCSP.

The enhanced OCSP request 118 includes an OCSP2Request message structure 202. The OCSP2Request message structure 202 includes a plurality of data fields. The OCSP2Request message structure 202 may be broken down into two primary sections, a tbsRequest section 204 and a signature section 206. The tbsRequest 204 carries all the data covered by the signature 206 and identifies the certificate for which the revocation status is requested. In some embodiments, the signature section 206 is optional. The OCSP2Request message structure 202 may also be described as:

```
OCSP2Request ::= SEQUENCE {
    tbsRequest          OCSP2TBSRequest, -- The Signed Data Structure
    optionalSignature   [0] EXPLICIT OCSP2ReqSignature OPTIONAL }
```

In the exemplary embodiment, the tbsRequest (OCSP2TBSRequest) 204 includes data fields such as version 208, targetCertificate 210, and requestExtension 212. The version 208 identifies the version of the protocol being used for the OCSP request 118. The version 208 is set to the appropriate version, such as '2' for OCSP2 requests. The targetCertificate fields 210 identify the target digital certificate that the OCSP request 118 is being made for. The requestExtensions 212 include optional extensions for the OCSP2 request.

The tbsRequest (OCSP2TBSRequest) 204 structure may also be described as:

```
OCSP2TBSRequest ::= SEQUENCE {
    version         INTEGER Version DEFAULT v2,
    -- Identifies the version of the protocol
    targetCertificate   OCSP2CertId, --- The identifier for the target cert
    requestExtensions [2] EXPLICIT Extensions OPTIONAL
    --- Extensions for the OCSP2 Requests }
```

In the exemplary embodiment, the targetCertificate (OCSP2CertId) 210 includes data fields such as targetSerial 214, caCertID 216, and algorithmIdentifier 218. The targetSerial 214 includes the serial number of the certificate whose status is being requested. The caCertID 216 identifies the certificate of the issuing CA 108 (shown in FIG. 1), aka the CA 108 that issued the certificate. In some embodiments, the caCertID 216 contains the hash value calculated from the DER (distinguished encoding rules) representation of the issuing CA's certificate. The algorithmIdentifier 218 includes the object identifier (OID) of the hash algorithm used to calculate the value of the caCertID 216 field. In some embodiments, the default hash algorithm is SHA-256. In these embodiments, if the SHA-256 algorithm is used, then the field is omitted and implicitly indicates that the SHA-256 algorithm was used.

The targetCertificate (OCSP2CertId) 210 structure may also be described as:

```
OCSP2CertId ::= SEQUENCE {
    targetSerial INTEGER,      --- Serial Number of the target cert,
    caCertId OCTET STRING, --- Hash of the Issuing CA Cert (DER),
    algorithmIdentifier [1] EXPLICIT AlgorithmIdentifier OPTIONAL,
    --- Hashing Algorithm (Def SHA-256) }
```

In the exemplary embodiment, the signature section (OCSP2ReqSignature) 206 includes data fields such as signatureValue 220, signatureAlgorithm 222, signerCertificate 224, and otherCerts 226. The signatureValue 220 field is the value of the signature calculated over the DER encoding of the tbsRequest structure 204 by using the signature algorithm identified in the signatureAlgorithm field 222. The signatureAlgorithm field 222 includes the OID that identifies the signing algorithm used to calculate the value in the signatureValue field 220. The signerCertificate field 224 comprises the DER encoded certificate of the request's signer. The otherCerts field 226 contains all the certificates required for the validation of the signer's certificate up to the Root. In some embodiments, the field can be omitted in case other means (e.g., an AuthorityInfoAccess extension) can be used by the OCSP Responder 106 (shown in FIG. 1) to build the chain of certificates up to a trusted Root CA. In some of these embodiments, the RootCA certificate itself is not added to the otherCerts field 226.

The signature section (OCSP2ReqSignature) 206 structure may also be described as:

```
OCSP2ReqSignature ::= SEQUENCE {
    signatureValue BIT STRING,          --- Holds the signature's value
    signatureAlgorithm AlgorithmIdentifier, --- OID for the Signature algorithm
    signerCertificate Certificate OPTIONAL, --- Signer's Certificate in DER format
    otherCerts [1] EXPLICIT SEQUENCE OF Certificate OPTIONAL
    --- Stack of Certificates for Signature Validation }
```

In some embodiments, the OCSP2Request 118 may have more or less fields to perform the functions as described herein. Furthermore, the specific fields, field names, and field structures are for example purposes and may be rearranged as necessary to perform the desired functions described herein.

Figure 3:
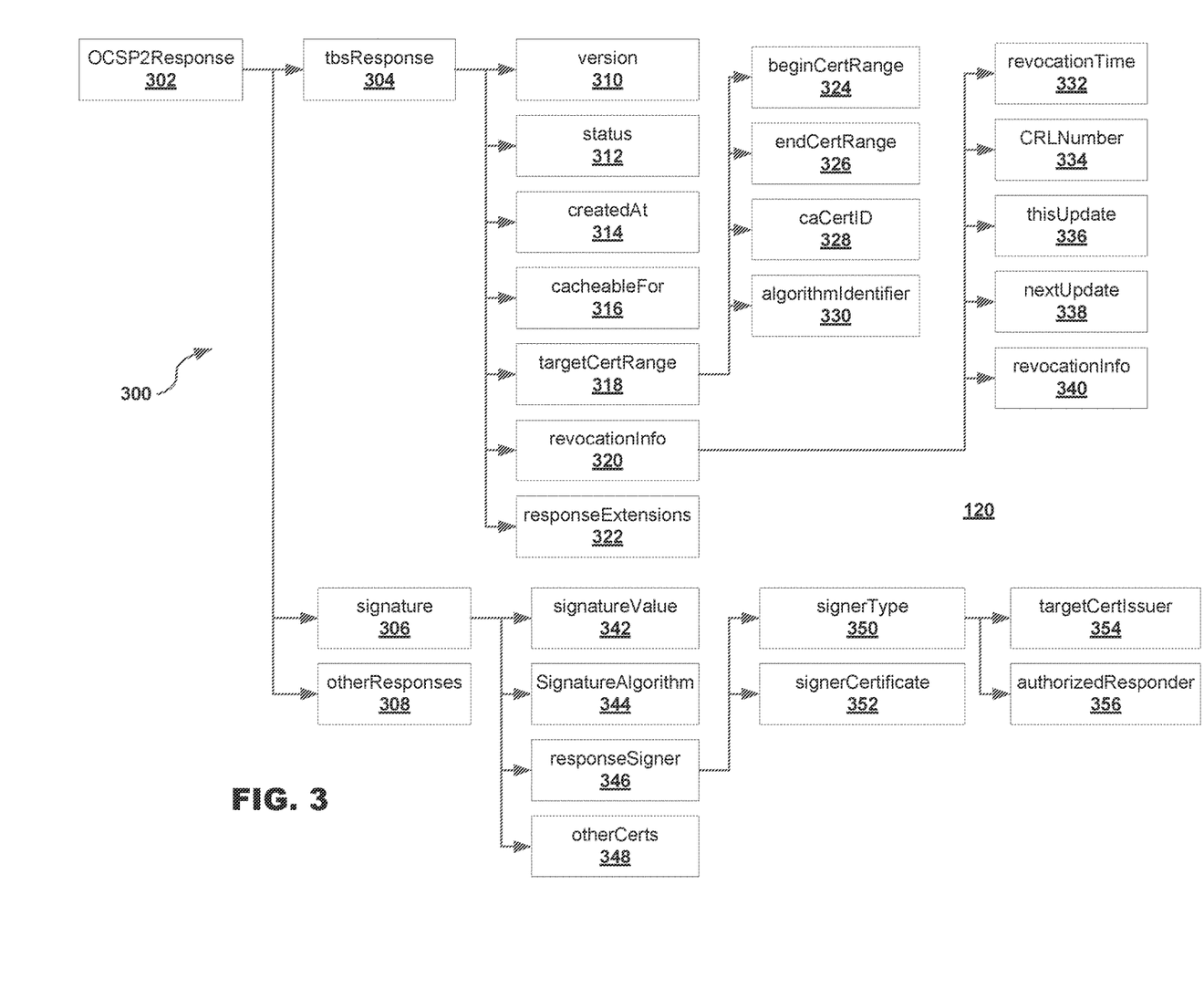
FIG. 3 is a schematic illustration of the data structure of the enhanced OCSP response shown in FIG. 1.

FIG. 3 is a schematic illustration of the data structure of the enhanced OCSP response 120 shown in FIG. 1. For the purposes of this explanation, the enhanced OCSP will notated as OCSP2 to distinguish it from basic OCSP.

The enhanced OCSP response 120 includes an OCSP2Response message structure 302. The OCSP2Response message structure 302 includes a plurality of data fields. The OCSP2Response message structure 302 may be broken down into three primary sections, a tbsResponse section 304, a signature section 306, and an otherResponses section 308. The tbsResponse (OCSP2TBSResponse) 304 carries all the data covered by the signature 306 and is the core of the response for the identified target certificate or range of certificates. The signature 306 contains the signature value that is calculated over the DER representation of the tbsResponse structure 304. In some embodiments, the signature section 306 contains additional data that may be used in validating the response's signer certificate.

The "otherResponses" field 308 contains a set of OCSP2Response that might be attached by the OCSP responder 106 (shown in FIG. 1) to provide additional responses for the validation of the target's certificate chain. For example, the added responses may be used to validate the issuing CA's revocation status up to the root. The responses are ordered from the response for the target certificate's issuing CA up to the Root CA, which is excluded.

In contrast to basic OCSP (or OCSPv1), the enhanced OCSP allows for the ability to attach additional responses (not necessarily signed by the same OCSP responder 106). The enhanced OCSP also allows the ability to provide, in the same response, all of the required revocation information needed to validate an entire chain of certificates.

Operationally, an OCSP responder 106 (or an offline signer) can periodically update the otherResponses field 308 without the need to re-sign the tbsResponse 304. Since each of the provided additional responses MUST be signed by the authoritative responder, the fact that the field is not covered by the responder's signature does not pose a security threat.

A relying party, such as user computer device 102 (shown in FIG. 1) will check the field for additional OCSP responses that might be needed for the validation of the target's certificates chain. In addition, the relying party may query the authoritative responder if the additional OCSP responses are not available, not trusted, or their creation time is too far in the past according to the specific application's policy.

The OCSP2Response message structure 302 may also be described as:

```
OCSP2Response ::= SEQUENCE {
  tbsResponse OCSP2TbsResponse, --- Core of the response data
  structures that is covered under the signature
  signature OCSP2RespSignature, --- The authentication signature
  for the response
  otherResponses [0] EXPLICIT OCSP2Response OPTIONAL
  --- Set of additional responses for the certificates in the target's
  certificates chain }
```

In the exemplary embodiment, the tbsResponse (OCSP2TbsResponse) 304 includes data fields such as version 310, status 312, createdAt 314, cacheableFor 316, targetCertRange 318, revocationInfo 320, and responseExtensions 322. The version 310 identifies the version of the protocol being used for the OCSP response 120. The version 310 is set to the appropriate version, such as '2' for OCSP2 responses.

The status field 312 includes one of the values from the OCSP2Status enumeration. The values reflect the values used in OCSPv1. The first three values are used in the response when the request is successfully processed and the OCSP responder 106 can provide the answer for the target certificate. In the case that the responder 106 cannot process the request or encounters internal or other errors that affects its capabilities to provide the requested answer, the responder 106 will use one of the error codes (values 3 or higher). The status codes may be described as follows:

```
OCSP2Status ::= ENUMERATED {
  good (0), --- Certificate is Valid
  revoked (1), --- Certificate is revoked
  unknownIssuer (2), --- Certificate is unknown
  malformedRequest (3), --- Request can not be processed
  internalError (4), --- Internal Server Error
  tryLater (5), --- Try Again Later
  sigRequired (6), --- Must Sign the Request
  unauthorized (7) --- Request unauthorized }
```

In the exemplary embodiment, the "valid" (0) value is used when the responder 106 is available and the status of the certificates in the targetCertRange 318 is not revoked. The "revoked" (1) value is used when the responder 106 is available and the status of the certificates in the targetCertRange 318 is revoked. The "unknownIssuer" (2) value is used when the responder 106 is available but the issuer 108 of the target certificate is unknown or the server is not authorized to provide responses for the identified target. In this case, the request 118 may be retried with another responder 106.

The "malformedRequest" (3) value is used when the responder 106 is available but the request can not be process because it can not be successfully parsed. The request 118 may be retried with the same responder 106. After receiving the same error, the client/requestor 102 might consider querying a different responder 106. For example, data might be getting corrupted when submitting the request 118 to this particular responder 106. The "internalError" (4) value is used when the responder 106 can not generate responses 120 due to an inconsistent internal state. The request 118 should be retried (potentially with another responder 106 if available). The "tryLater" (5) value is used when the responder 106 is operational but can not generate responses due to temporary errors or lack of authoritative data. The request 118 should be retried at a later time. The "sigRequired" (6) value indicates that the responder 106 requires the client/requestor 102 to sign its requests in order for the responder 106 to provide valid responses. The "notAuthorized" (7) value is used when the client/requestor 102 is not authorized to send its request 118 to the queried responder 106 or the request's signature is not valid or not trusted by the server 106. In other embodiments, additional status values may be available for additional situations.

The createdAt field 314 is set with the time at which the response 120 was created. This also marks the time at which the status of the certificate is known to be accurate by the OCSP responder 106. The relying party 102, when validating the response 120, must check this field and verify that its value is not in the future and its freshness is acceptable according to the application's requirements. Applications might decide to reject a response that is considered too old, even if the OCSP response 120 is considered cacheable, see the cacheableFor field 316.

If set, the cacheableFor field 316 indicates for how long the response 120 is be cached. In the exemplary embodiment, the cacheableFor field 316 is in seconds, but may be any appropriate period of time. The OCSP responder 106 would use this field to indicate when a new response 120 will be available for the targetCertificate 210. In some embodiments, this field is be omitted when information is available at the transport protocol level (e.g., by setting the appropriate TTL in the DNS entry or by using the appropriate header when delivering the response via HTTP).

The targetCertRange field 318 identifies the range of certificates that the response's status is valid for. The targetCertRange field 318 is required to be present when the response's status code is "good" (0) or "revoked" (1). The targetCertRange field 318 is required to be absent when the response's status 312 code value is equal to or greater than (2).

The revocationInfo field 320 carries extended revocation information for revoked certificates only. The revocationInfo field 320 is omitted in case the response code is not "revoked" (2). The revocationInfo field 320 is required to be present for responses that carry the "revoked" (2) code. The revocationInfo field 320 as a structure is described below in more detail.

The responseExtensions field 322 reserves space to provide additional information for the response 120 as is required by the system to perform the functions described herein. The responseExtensions field 322 is an optional field.

The tbsResponse (OCSP2TbsResponse) 304 structure may also be described as:

```
OCSP2TbsResponse ::= SEQUENCE {
  version INTEGER Version DEFAULT v2 OPTIONAL,
  status OCSP2Status,
  createdAt GeneralizedTime,
  cacheableFor INTEGER OPTIONAL,   --- Number of seconds for
  which the response can be cached
  targetCertRange [1] OCSP2CertRange,   --- Range of certificates for
  which the response's status is valid for
  revocationInfo [2] EXPLICIT OCSP2RevInfo OPTIONAL,
  --- Extended revocation status info (for revoked certificates only)
  responseExtensions [3] EXPLICIT Extensions OPTIONAL }
```

In the exemplary embodiment, the targetCertRange (OCSP2CertRange) 318 includes data fields such as beginCertRange 324, endCertRange 326, caCertID 328, and algorithmIdentifier 330.

The beginCertRange field 324 contains the first serial number of the range of certificates for which the response's status is valid for. The value of the serial number is equal to or less then the value of the serial number present in the associated request 118 when generated dynamically. When pre-generating the request 118 the value is set to the first serial number of the range of certificates for which the response is generated for. For example, when using CRLs as the authoritative source of the revocation information, a response 120 can cover all the serial numbers comprised between two revocation entries in the CRL by setting this field to (rev_entry_a+1) and the endCertRange field 326 to (rev_entry_b−1). The minimum acceptable value for this field is zero (0).

The endCertRange 326 field contains the last serial number of the range of certificates for which the response's status is valid for. If present, the value of the endCertRange 326 must be equal to or greater than the beginCertRange 324 value. If omitted, the response status code is valid for all certificates whose serial number is equal to or greater than the value in the beginCertRange field 324 (e.g., for every certificate whose serial number is equal to or greater than the value in the beginCertRange field 324). To convey a response for a single serial number (e.g., for a single revoked certificate), the endCertRange 326 and the beginCertRange 324 fields are set to the same value.

The caCertId 328 is used to uniquely identify the certificate of the target certificates' issuing CA 108), aka the CA 108 that issued the certificate. When dynamically generating the responses, the value should match the value carried in the request (either from the OCSP2Request 202 or from the request parameters specified according to the used the transport protocol). In some embodiments, the caCertID 328 contains the hash value calculated from the DER (distinguished encoding rules) representation of the issuing CA's certificate. The algorithmIdentifier 330 includes the OID of the hash algorithm used to calculate the value of the caCertID 328 field. In some embodiments, the default hash algorithm is SHA-256. In these embodiments, if the SHA-256 algorithm is used, then the field is omitted and implicitly indicating that the SHA-256 algorithm was used.

The targetCertRange (OCSP2CertRange) 318 structure may also be described as:

```
OCSP2CertRange ::= SEQUENCE {
  beginCertificateRange INTEGER, --- Begin (inclusive) of the range of
  serial numbers for which the status is asserted
  endCertificateRange [2] EXPLICIT INTEGER OPTIONAL,
  --- If present, provides indication of the last (inclusive) serial number
  for which the status is asserted
  caCertId OCTET STRING,    --- Hash of the Issuing CA Cert (DER),
  algorithmIdentifier [1] EXPLICIT AlgorithmIdentifier OPTIONAL,
  --- Hashing Algorithm (Def. SHA-256) }
```

In the exemplary embodiment, the revocationInfo (OCSP2RevInfo) 320 includes data fields such as revocationTime 332, CRLNumber 334, thisUpdate 336, nextUpdate 338, and revocationInfo 340.

The revocationTime field 332 is set at the time of revocation (if the information is available on the responder 106). When operating out of CRLs, the information is derived from the revocation time in the CRLs entries (the time should apply to all revoked entries in the targetCertRange 318). If no specific time is available or the specific revocation time is different for one or more entries in the targetCertRange 318 of the response, the revocationTime 332 should be set to be equal to the thisUpdate 336 field of the authoritative CRL.

The CRLNumber field is set by the responder 106 with the value extracted from the CRL where the revocation information is asserted. This may be a unique identifier of the corresponding CRL. The thisUpdate field 336 is set by the responder 106 and its value is extracted from the thisUpdate field of the CRL where the revocation information is asserted. The nextUpdate field 338 is set by the responder 106 and its value is extracted from the thisUpdate field of the CRL where the revocation information is asserted.

The revocationInfo field 340 is set by the responder 106 and its value equal to the CRLReason used for ALL the entries in the targetCertRange 318 set in the response. A responder 106 may omit the value in case the set of certificates present in the targetCertRange 318 have been revoked with different revocation reasons values.

The revocationInfo (OCSP2RevInfo) 320 structure may be defined as follows:

```
OCSP2RevInfo ::= SEQUENCE {
  revocationTime GeneralizedTime,
  CRLNumber [0] EXPLICIT INTEGER OPTIONAL,
  thisUpdate [1] EXPLICIT GeneralizedTime OPTIONAL,
  nextUpdate [2] EXPLICIT GeneralizedTime OPTIONAL,
  revocationInfo [3] EXPLICIT CRLReason OPTIONAL
}
```

In the exemplary embodiment, the signature section (OCSP2RespSignature) 306 includes data fields such as signatureValue 342, signatureAlgorithm 344, responseSigner 346, and otherCerts 348. The signatureValue 342 field is the value of the signature calculated over the DER encoding of the tbsResponse structure 304 by using the signature algorithm identified in the signatureAlgorithm field 344. The signatureAlgorithm field 344 includes the OID that identifies the signing algorithm used to calculate the value in the signatureValue field 342.

The responseSigner field 346 identifies the response's signer (through the OCSP2ResponseSigner data structure). In some embodiments, the two different types of responders 106 are supported. These responders 106 include the target certificate's issuing CA 108 or an authorized responder 106. The first type is used when OCSP2 responses 120 are signed by the same CA 108 that issued the target certificate. The second type is used when an authorized entity other than the target certificate's issuing CA 108 is used to sign the response 120.

The otherCerts field 348 contains all the certificates required for the validation of the signer's certificate up to the Root. If the responder type used in the response 120 is targetCertIssuer 354, the responder 106 may omit the field assuming that the requesting entity 102 already has the set of certificates needed to build the certificate chain (i.e., the chain is the same as the one used to validate the targetCertificate). The field may also be omitted when the responder type is authorizedResponder 356 in case other means (e.g., the AuthorityInfoAccess extension) can be used by the relying party 102 to build the chain of certificates up to a trusted Root CA. The RootCA certificate itself should not be added to the otherCerts field 348.

The signature section (OCSP2RespSignature) 306 structure may also be described as

```
OCSP2RespSignature ::= SEQUENCE {
    signatureValue BIT STRING,   --- Signature's value
    signatureAlgorithm AlgorithmIdentifier, --- OID for the Signature
    algorithm
    responseSigner OCSP2ResponseSigner, --- Identifies the type of
    responder and optionally the signer's certificate
    otherCerts [1] EXPLICIT SEQUENCE OF Certificate OPTIONAL
    --- Stack of Certificates for Signature Validation }
```

In the exemplary embodiment, the responseSigner (OCSP2ResponseSigner) 346 includes data fields such as signerType 350 and signerCertificate 352. The responseSigner structure 346 identifies the signer of the response 120. The signerType 350 identifies the type of responder 106 that is sending the response 120. The signerType codes may be described as follows:

```
ResponderType ::= ENUMERATED {
    targetCertificateIssuer (0), --- The signer's certificate is the same as the
    issuer of the target certificate
    authorizedResponder (1), --- This identifies the responder to be a
    separate entity from the target cert's issuing CA. In this case the
    responder adds the responder's certificate in the signerCertificate field
    of the OCSP2RespSigner structure }
```

In the exemplary embodiment, the targetCertificateIssuer (0) value is used to indicate that the certificate of the response's signer is the same as the target certificate's issuing CA 108. When this value is used, the responder 106 omits the otherCerts 348 field in the signature structure 306 under the assumption that the certificate chain that is used to validate issuing CA's certificate is a subset of the target certificate one. In this case, the responder 106 also omits the signerCertificate field 352 in the responseSigner structure 346. The authorizedResponder (1) value is used to indicate that the response's signer is a separate entity from the target certificate's issuing CA 108. In this case, the responder 106 adds the signer's certificate in the signerCertificate field 352 in the responseSigner structure 346. In case the signer's certificate is not signed by the same CA 108 that signed the target's certificate, the responder 106 also adds all the remaining certificates from the signer's certificate chain up to (but excluding it) the Root CA. While OCSP2 describes support for two different types of responders as defined here, additional types of responders may be supported.

The signerCertificate value 352, if set, contains the DER representation of the certificate of the entity that signed the response 120.

The responseSigner structure (OCSP2ResponseSigner) 346 may also be described as:

```
OCSP2RespSigner ::= SEQUENCE {
    signerType ResponderType,
    signerCertificate [0] EXPLICIT Certificate OPTIONAL
    --- In case the SignerType is set to 0, the responder may omit the
    signer's certificate, the value of this field is expected to be the Signer's
    Certificate in DER format }
```

In some embodiments, the messages described herein support the use of extensions (e.g. AuthorityInfoAccess extension) to provide additional information related to the processing of requests 118 and responses 120. In these embodiments, the extensions would not be marked as critical.

In some embodiments, the messages described herein support the addition of a nonce to the messages. In order to mitigate possible replay attacks, the requestor 102 may decide to include a nonce in a request 118. The nonce, when used in the response 120, provides a method to cryptographically bind the two (i.e., request 118 and response 120). In particular, if supported by the responder 106 and in embodiments where responses 120 are generated dynamically, the value of the NONCE extension in the request 118 is to be copied in the same extension in the response 120.

For example, the extension's definition may follow the specification in section 4.4.1 of [RFC 6960]:

```
id-pkix-ocsp OBJECT IDENTIFIER ::= { id-ad-ocsp }
id-pkix-ocsp-nonce OBJECT IDENTIFIER ::= { id-pkix-ocsp 2 }
Nonce ::= OCTET STRING
```

In some embodiments, there may be extensions that are restricted and must not be included in any request 118 and/or response 120. These extensions may be restricted based on policies set by at least one of the requestor 102, the responder 106, and the CA 108.

For example, the Extended Revocation Definition as outlined in [RFC 6960] may be restricted from being added to enhanced OCSP responses 120 despite being allowed for basic OCSP responses. In some embodiments, this extension is explicitly prohibited in OCSP2 to prevent CAs 108 from abusing the extension and providing "revoked" responses that can not be verified by the client (e.g., comparing the responses against the CRL does not provide validation of the validity of the reported revocation status).

In some embodiments, where the responder 106 is unable to assert the validity status of a certificate, the relying parties 102 should use different protocols (such as Server-based Certificate Validation Protocol (SCVP)) or other resources such as Certificate Transparency to assert the validity of the target certificate.

While the above description lists one or more specific cryptographic algorithms, one having skill in the art would understand that other cryptographic algorithms may be used. For example, in the algorithIdentifier field 218, SHA-256 may be identified as being used. However, the system explicitly allows support for any number of other algorithms to be used herein. The above systems describe multiple different potential security considerations to improve the security of the OCSP messaging system to prevent intrusions such as "replay attacks." Other security considerations would be known to ones having skill in the art.

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

The exemplary embodiments provided herein describe a messaging system for requesting and receiving the revocation status of digital certificates, that is advantageously disposed within one or more of the computer device, the certificate authority, and a network of one or more responder servers, to track and report on the revocation status of digital certificates. The messaging system thus functions as a verification system capable of: (i) repeatedly reporting on the status of a target digital certificate to ensure trust between devices; (ii) simplify the requirements for deploying revocation infrastructures; (iii) reducing the number of bits on the wire by removing less used options; (iv) lowering the deployment costs of revocation infrastructures by optimizing responses for non-revoked cases; and (v) greatly reducing the requirements in terms of the number of generated signatures, especially in environments where revocation events are rare.

The aspects described herein may be implemented as part of one or more computer components such as a client device and/or one or more back-end components, such as a responder, for example. Furthermore, the aspects described herein may be implemented as part of computer network architecture and/or a cognitive computing architecture that facilitates communications between various other devices and/or components. Thus, the aspects described herein address and solve issues of a technical nature that are necessarily rooted in computer technology.

For instance, aspects include analyzing the current status of digital certificates to determine the status of those certificates to allow trust to be built between devices to improve security. Furthermore, these aspects reduce the chance of data compromise and allow for proposer access to computer systems. Without the improvements suggested herein, additional processing and memory usage would be required to perform such activities. Additional technical advantages include, but are not limited to: i) improved speed and responsiveness in communication with a connected device; ii) reduced message traffic; iii) ensuring that the revocation status of certificates is properly reported; iv) reducing the potential for out-of-date information; v) providing sufficient information for requestors to make informed decisions about digital certificates; and vi) allow for constant monitoring of the revocation state of digital certificates. Additional technical advantages are described in other sections of the specification.

Furthermore, the embodiments described herein improve upon existing technologies, and improve the functionality of computers, by more accurately predict or identify the current status of digital certificates. The present embodiments improve the speed, efficiency, and accuracy in which such calculations and processor analysis may be performed. Due to these improvements, the aspects address computer-related issues regarding efficiency over conventional techniques. Thus, the aspects also address computer related issues that are related to computer security, for example.

Accordingly, the innovative systems and methods described herein are of particular value within the realm of secure Internet communications. The present embodiments enable more reliable updating and monitoring of such communications, but without compromising data and speed. Furthermore, according to the disclosed techniques, user computer device are better able to monitor and determine the security of websites and other connected devices, and thereby protecting computer devices from malicious actors.

Exemplary embodiments of systems and methods for determining revocation statuses of digital certificates are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for monitoring the status of digital certificates comprising:
   a responder computer device including at least one processor in communication with at least one memory device, wherein the at least one memory device stores a plurality of instructions, which, when executed by the at least one processor, cause the at least one processor to:
   store, in a database, a plurality of statuses associated with a plurality of digital certificates;
   receive, from a first computer device, a first request message including an identifier of a target certificate, wherein the first request message includes a protocol version of at least one supported protocol, and wherein the target certificate includes (i) a first address for a first responder supporting basic requests for the at least one supported protocol, and (ii) a second address for a second responder supporting enhanced requests for the at least one supported protocol;
   query the database to retrieve status information about the target certificate;
   generate a first response message based on the retrieved status information and the protocol version in the first request message; and transmit the first response message to the first computer device,
wherein the responder computer device corresponds to at least one of the first and second responders, and
wherein the basic requests for the at least one supported protocol are different from the enhanced requests for the at least one supported protocol.

2. The system in accordance with claim 1, wherein each of the plurality of digital certificates includes a serial number, and wherein the instructions further cause the at least one processor to:
determine a first range of unrevoked digital certificates based on the plurality of statuses and the corresponding serial numbers;
determine that the target certificate is in the first range of unrevoked digital certificates; and
generate the first response message to include the first range of unrevoked digital certificates.

3. The system in accordance with claim 2, wherein the instructions further cause the at least one processor to:
determine a second range of revoked digital certificates based on the plurality of statuses and the corresponding serial numbers;
determine that the target certificate is in the second range of revoked digital certificates; and
generate the first response message to include the second range of revoked digital certificates.

4. The system in accordance with claim 3, wherein the instructions further cause the at least one processor to:
receive a certificate revocation list; and
determine at least one of the first range of unrevoked digital certificates and the second range of revoked digital certificates based on the certificate revocation list.

5. The system in accordance with claim 1, wherein the first response message includes a first time stamp indicating when the first response message was generated, and a first time amount indicating an amount of time for which the first response message is valid.

6. The system in accordance with claim 1, wherein the first response message includes a single status field that includes values for both status of the digital certificate and status of the responder computer device.

7. The system in accordance with claim 6, wherein the single status field includes values for certificate is valid, certificate is revoked, certificate is unknown, request cannot be processed, internal server error, try again later, request must be signed, and request is unauthorized.

8. The system in accordance with claim 1, wherein the first response message further includes required revocation information to allow the first computer device to validate an entire chain of certificates up to a root certificate.

9. The system in accordance with claim 1, wherein the request message supports at least a first protocol and a second protocol.

10. The system in accordance with claim 1, wherein the instructions further cause the at least one processor to:
store a plurality of response message data structures associated with a plurality of versions of the first protocol including the first protocol version and the second protocol version;
determine that the first request message is associated with the second protocol version; and
generate the first response message based on the second protocol version.

11. The system in accordance with claim 10, wherein the instructions further cause the at least one processor to:
receive a second request message;
determine that the second request message is associated with the first protocol version; and
generate a second response message based on the first protocol version.

12. The system in accordance with claim 1, wherein the instructions further cause the at least one processor to:
determine that the first request message is associated with the first protocol version; and
reroute the first request message to a second responder computer device, wherein the second responder computer device is configured to respond with the first protocol version.

13. A method for monitoring the status of digital certificates, the method implemented by a responder computer device including at least one processor in communication with at least one memory device configured to store a plurality of instructions, the method comprising steps of:
storing, in a database, a plurality of statuses associated with a plurality of digital certificates;
receiving, from a first computer device, a first request message including an identifier of a target certificate, wherein the first request message supports a first protocol and includes at least one of a first protocol version of the first protocol and a second protocol version of the first protocol, and wherein the target certificate includes (i) a first address for a first responder supporting basic requests for the at least one supported protocol, and (ii) a second address for a second responder supporting enhanced requests for the at least one supported protocol;
querying the database to retrieve status information about the target certificate;
generating a first response message based on the retrieved status information and the at least one of the first and second protocol versions in the first request message; and
transmitting the first response message to the first computer device,
wherein the responder computer device corresponds to at least one of the first and second responders, and
wherein the basic requests for the at least one supported protocol are different from the enhanced requests for the at least one supported protocol.

14. The method in accordance with claim 13, wherein each of the plurality of digital certificates includes a serial number, and wherein the method further comprises steps of:
determining a first range of unrevoked digital certificates based on the plurality of statuses and the corresponding serial numbers;
determining that the target certificate is in the first range of unrevoked digital certificates; and
generating the first response message to include the first range of unrevoked digital certificates.

15. The method in accordance with claim 14, further comprising steps of:
determining a second range of revoked digital certificates based on the plurality of statuses and the corresponding serial numbers;
determining that the target certificate is in the second range of revoked digital certificates; and
generating the first response message to include the second range of revoked digital certificates.

16. The method in accordance with claim 15, further comprising steps of:
   receiving a certificate revocation list; and
   determining at least one of the first range of unrevoked digital certificates and the second range of revoked digital certificates based on the certificate revocation list.

17. The method in accordance with claim 13, further comprising steps of:
   storing a plurality of response message data structures associated with a plurality of versions of the first protocol including the first protocol version and the second protocol version;
   determining that the first request message is associated with the second protocol version; and
   generating the first response message based on the second protocol version.

18. The method in accordance with claim 17, further comprising steps of:
   receiving a second request message;
   determining that the second request message is associated with the first protocol version; and
   generating a second response message based on the first protocol version.

19. The method in accordance with claim 13, further comprising steps of:
   determining that the first request message is associated with the first protocol version; and
   rerouting the first request message to a second responder computer device, wherein the second responder computer device is configured to respond with the first protocol version.

* * * * *